US007822969B2

(12) United States Patent
Anglin

(10) Patent No.: US 7,822,969 B2
(45) Date of Patent: Oct. 26, 2010

(54) WATERMARK SYSTEMS AND METHODS

(75) Inventor: Hugh W. Anglin, Claremore, OK (US)

(73) Assignee: Digimarc Corporation, Beaverton, OR (US)

( * ) Notice: Subject to any disclaimer, the term of this patent is extended or adjusted under 35 U.S.C. 154(b) by 1094 days.

(21) Appl. No.: 10/122,141

(22) Filed: Apr. 12, 2002

(65) Prior Publication Data

US 2003/0032033 A1    Feb. 13, 2003

Related U.S. Application Data

(60) Provisional application No. 60/284,163, filed on Apr. 16, 2001.

(51) Int. Cl.
*H04L 29/06*        (2006.01)
*H04L 9/00*         (2006.01)
(52) U.S. Cl. .................. 713/150; 713/189; 380/200; 380/247; 380/255
(58) Field of Classification Search ............. 713/150, 713/178; 380/1, 28, 255; 709/217, 219, 709/227, 230, 250, 313, 328, 329
See application file for complete search history.

(56) References Cited

U.S. PATENT DOCUMENTS

| | | | |
|---|---|---|---|
| 4,225,967 A | 9/1980 | Miwa et al. | |
| 4,528,588 A | 7/1985 | Lofberg | |
| 5,200,822 A | 4/1993 | Bronfin et al. | |
| 5,450,490 A | 9/1995 | Jensen et al. | |
| 5,568,570 A | 10/1996 | Rabbani | |
| 5,574,962 A | 11/1996 | Fardeau et al. | |
| 5,646,997 A | 7/1997 | Barton | |
| 5,764,770 A * | 6/1998 | Schipper et al. | 713/176 |
| 5,765,176 A | 6/1998 | Bloomberg | |
| 5,809,139 A | 9/1998 | Girod et al. | |
| 5,857,038 A | 1/1999 | Owada et al. | |
| 5,889,868 A | 3/1999 | Moskowitz et al. | |
| 5,901,224 A | 5/1999 | Hecht | |
| 5,905,800 A | 5/1999 | Moskowitz et al. | |
| 5,933,798 A | 8/1999 | Linnartz | 702/191 |
| 5,937,000 A | 8/1999 | Lee et al. | |
| 6,002,946 A | 12/1999 | Reber et al. | |
| 6,037,984 A | 3/2000 | Isnardi et al. | |
| 6,122,403 A | 9/2000 | Rhoads | 382/233 |
| 6,131,162 A | 10/2000 | Yoshiura et al. | |
| 6,148,331 A | 11/2000 | Parry | |
| 6,209,092 B1 | 3/2001 | Linnartz | |
| 6,209,094 B1 | 3/2001 | Levine et al. | |
| 6,233,684 B1 | 5/2001 | Stefik et al. | |
| 6,247,050 B1 * | 6/2001 | Tso et al. | 709/224 |
| 6,272,176 B1 | 8/2001 | Srinivasan | |
| 6,282,362 B1 | 8/2001 | Murphy et al. | |
| 6,298,166 B1 | 10/2001 | Ratnakar et al. | |
| 6,330,672 B1 | 12/2001 | Shur | |
| 6,332,030 B1 | 12/2001 | Manjunath et al. | |
| 6,345,256 B1 | 2/2002 | Milsted et al. | |
| 6,381,698 B1 | 4/2002 | Devanbu et al. | |
| 6,385,329 B1 | 5/2002 | Sharma et al. | |
| 6,386,453 B1 | 5/2002 | Russell et al. | |
| 6,393,060 B1 | 5/2002 | Jeong | |
| 6,400,826 B1 | 6/2002 | Chen et al. | |
| 6,404,926 B1 | 6/2002 | Miyahara et al. | |
| 6,425,081 B1 | 7/2002 | Iwamura et al. | |
| 6,483,927 B2 | 11/2002 | Brunk et al. | |
| 6,499,105 B1 | 12/2002 | Yoshiura et al. | |
| 6,505,160 B1 | 1/2003 | Levy et al. | |
| 6,513,118 B1 | 1/2003 | Iwamura | |
| 6,529,506 B1 | 3/2003 | Yamamoto et al. | |
| 6,557,103 B1 | 4/2003 | Boncelet, Jr. et al. | |
| 6,563,935 B1 | 5/2003 | Echizen et al. | |
| 6,577,745 B1 | 6/2003 | Op De Beeck et al. | |
| 6,601,772 B1 * | 8/2003 | Rubin et al. | 235/494 |
| 6,608,930 B1 | 8/2003 | Agnihotri et al. | |
| 6,614,914 B1 | 9/2003 | Rhoads | |
| 6,631,198 B1 | 10/2003 | Hannigan et al. | |
| 6,642,966 B1 | 11/2003 | Limaye | |
| 6,654,479 B1 | 11/2003 | Liao et al. | |
| 6,665,419 B1 | 12/2003 | Oami | |
| 6,687,345 B1 | 2/2004 | Swartz et al. | |
| 6,707,928 B2 | 3/2004 | Acharya et al. | |
| 6,724,914 B2 | 4/2004 | Brundage et al. | |
| 6,751,359 B1 | 6/2004 | Handley | |
| 6,834,308 B1 | 12/2004 | Ikezoye et al. | |
| 7,058,223 B2 | 6/2006 | Cox | |
| 2001/0028727 A1 | 10/2001 | Naito et al. | |
| 2001/0037210 A1 | 11/2001 | Hirayama | |

(Continued)

FOREIGN PATENT DOCUMENTS

WO    WO9743736    11/1997

(Continued)

OTHER PUBLICATIONS

"lossless compression" defintion, Webopedia Computer Dictionary, 2004, online at http://www.webopedia.com/TERM/lossless_compression.html, 2 pages.*

(Continued)

*Primary Examiner*—Carolyn L. Smith

(57) ABSTRACT

Various improvements relating to digital watermarking and related technologies are detailed, including methods that enhance security and functionality, and new articles including watermarked puzzles and marked DNA.

4 Claims, No Drawings

U.S. PATENT DOCUMENTS

| | | |
|---|---|---|
| 2002/0023058 A1 | 2/2002 | Taniguchi et al. |
| 2002/0032863 A1 | 3/2002 | Ha et al. |
| 2002/0034297 A1 | 3/2002 | Rhoads |
| 2002/0046178 A1 | 4/2002 | Morito et al. |
| 2002/0059162 A1 | 5/2002 | Shinoda et al. |
| 2002/0083324 A1 | 6/2002 | Hirai |
| 2002/0102966 A1 | 8/2002 | Lev et al. |
| 2002/0122568 A1 | 9/2002 | Zhao et al. |
| 2003/0072467 A1 | 4/2003 | Brundage et al. |
| 2003/0083098 A1 | 5/2003 | Yamazaki et al. |
| 2005/0116052 A1 | 6/2005 | Patton et al. |
| 2005/0229107 A1 | 10/2005 | Hull et al. |

FOREIGN PATENT DOCUMENTS

| | | |
|---|---|---|
| WO | WO0070585 | 11/2000 |
| WO | WO0237489 | 5/2002 |
| WO | WO03/034320 | 4/2003 |

OTHER PUBLICATIONS

Barni et al., "A new detector for the optimum recovery of nonadditive watermarks." May 2001. IEEE Transactions on Image Processing. vol. 10, Issue 5. pp. 755-766.

Gonzalez, et al., *Digital Image Processing*, Sec. 4.2, "Enhancement by Point Processing," 1992, pp. 166-189.

Jain *Fundamentals of Digital Image Processing*, Sec. 7.2, "Point Operations," 1995 reprint of 1989 publication, pp. 235-241.

"What is Progressive JPEG?" http://www.faqs.org/faqs/jpeg-faq/part1/section-11.html, Mar. 29, 2003, 2 pages.

Kutter, "Performance Improvement of Spread Spectrum Based Image Watermarking Schemes Through M-ary Modulation," Lecture Notes in Computer Science, 1999, 16 pages.

"Coding of Still Pictures," JPEG 2000, Digital Imaging Group, Dec. 10, 1999, 9 pages.

Friedman, The Trustworthy Digital Camera: Restoring Credibility to the Photographic Image, IEEE Trans. on Consumer Electronics, vol. 39, No. 4, pp. 905-910, 1993.

Yeung, Digital Watermarks: Shedding Light on the Invisible, IEEE Computer, pp. 32-41, 1998.

* cited by examiner

WATERMARK SYSTEMS AND METHODS

RELATED APPLICATION DATA

The present application claims priority benefit to provisional application 60/284,163, filed Apr. 16, 2001.

FIELD OF THE INVENTION

The present disclosure memorializes various improvements relating to digital watermarking and related technologies.

BACKGROUND

Digital watermarking is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present assignee's U.S. Pat. No. 6,122,403, and application Ser. No. 09/503,881 (now U.S. Pat. No. 6,614,914), are illustrative of certain watermarking technologies.

Watermarking can be used to tag objects with a persistent digital identifier, and as such finds myriad uses. Some are in the realm of device control—e.g., tagging video data with a do-not-copy flag that is respected by compliant video recorders. (The music industry's Secure Digital Music Initiative (SDMI), and the motion picture industry's Copy Protection Technical Working Group (CPTWG), are working to establish standards relating to watermark usage for device control.) Other watermark applications are in the field of copyright communication, e.g., indicating that an audio track is the property of a particular copyright holder.

Other watermark applications encode data that serves to associate an object with a store of related data. For example, an image watermark may contain an index value that serves to identify a database record specifying (a) the owner's name; (b) contact information; (c) license terms and conditions, (d) copyright date, (e) whether adult content is depicted, etc., etc. (The present assignee's MarcCentre service provides such functionality.) Related are so-called "connected content" applications, in which a watermark in one content object (e.g., a printed magazine article) serves to link to a related content object (e.g., a web page devoted to the same topic). The watermark can literally encode an electronic address of the related content object, but more typically encodes an index value that identifies a database record containing that address information. application Ser. No. 09/571,422 (now U.S. Pat. No. 6,947,571) details a number of connected-content applications and techniques.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The assignee's application Ser. Nos. 09/503,881 (now U.S. Pat. No. 6,614,914) and 09/452,023 (now U.S. Pat. No. 6,408,082) detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

With the foregoing by way of background, the specification next turns to the various improvements. It will be recognized that these improvements can typically be employed in many applications, and in various combinations with the subject matter of the patent documents cited herein.

DETAILED DESCRIPTION

Secure Transmission of Watermark Data

In application Ser. No. 09/571,422, a client-side application (a "reader" program) processes frames of video data from a web cam or other image sensor, and decodes watermarked information therefrom (e.g., based on luminance values in 128×128 pixel blocks). This information is then transmitted to a remote server, which responds to the client with a corresponding URL or other reply. The client-side application can then initiate a link to the specified URL, or otherwise respond to the reply.

An improved method offers enhanced security. As before, the client-side application processes frames of video data, and decodes watermarked information. This time, however, the application applies lossless compression to the block(s) of luminance values from which the watermark information was decoded, and may time-stamp this compressed block of information. The block may then be encrypted, e.g., using a private key (which may, or may not, be part of a private/public key pair). This encrypted block of information is then transmitted to the remote server.

The remote server decrypts the block (if necessary), and checks the time stamp to ensure that the data was stamped within an expected prior period (e.g., within the past 60 seconds). The compressed block is then decompressed, and the watermark is read from the luminance information. The remote server then determines the appropriate response for that watermark (e.g., a URL), and takes the corresponding action.

It will be recognized that there are a number of variations possible in such arrangements. As noted, the time-stamping and the encryption are optional. Lossy compression can be used instead of lossless. Or, if bandwidth constraints are not an issue, the block(s) can be transmitted without compression. Or, instead of transmitting the raw luminance information, it may be filtered in some manner first (e.g., median filtered), and the filtered data can be sent to the server (time-stamped, compressed, and/or encrypted). In some arrangements, the client-side application does not first decode the watermark, but instead transmits a block of luminance data prior to any watermark decoding. In some arrangements, the watermark information is not conveyed in the luminance data, but is conveyed otherwise.

It will be recognized that techniques such as those described above find applicability beyond the particular context of the '422 application, and may be used, e.g., in connection with watermarked still imagery, watermarked audio, etc., etc.

Digital Asset Management

Watermarking can play a key role in Digital Asset Management (DAM) systems.

Consider a "deep" web searching system in which a web searching agent runs locally on all registered web servers and reports back to a central database available for general web searching. To the user, the system looks just like Google or AltaVista. Advantages of the architecture include the following. The directories and times to search can be controlled by the web server webmaster. By running locally, the search agent can also search non-html files, such as Word documents, databases and linked media for deep searching. By running in a distributed architecture, more content can be searched and categorized. The web agent could run as a distributed agent on the web server, using idle company computers in the evening. In addition, the searching agent is intelligent. The agent can use tools such as RuleSpace for text and Virage for video categorization.

Images, audio, and video that are watermarked can be categorized and have associated usage rules based upon linking the watermark ID to one or more remote database servers, such as the "Grand Central" server detailed in the '422 application. Watermarked web content can be better categorized, thus improving consumers' searches and properly indexing every company's web server.

A similar novel structure can be used for internal digital asset management (DAM). This DAM structure runs within the company's Intranet, and the web agent runs on every employee's computer. More specifically, each employee marks directories that are continually searched, categorized and reported to the central Intranet search site. The employee moves important documents to that directory when finished, or allows people to search on documents in process. This helps employees of large companies to access company information (e.g., it helps HP know what HP knows).

While the above structure helps locate digital assets and associate usage rules, the system can also show the relationship between documents. For example, when a document is found in a search, all of the linked documents, such as for html, word, etc., and inserted objects, such as images, audio, video, etc., can be displayed.

By watermarking images, audio and video with IDs, the content can be categorized and associated with rules via the Grand Central database.

One of the key obstacles with any DAM system is the cost of inputting the metadata associated with each asset. By using watermarks to identify and link through a server (such as the Grand Central" system), this issue can be addressed.

Consider: a user takes a picture with a digital camera and stores the image in a DAM system. The user enters associated metadata (maybe the name of the beach it was taken on). The image is watermarked with an ImageID. The user now distributes the image to her business partners. One partner takes the image and stores it in his DAM system. This system recognizes the watermark, links through Grand Central to the first user's DAM system—which responds by supplying all the metadata. This data is automatically entered into the partner's system—improving productivity and accuracy, and gaining metadata that could not be determined from the image itself (the name of the beach).

This may be regarded as a way of allowing disparate DAM systems to interoperate.

The following article on DAM systems gives some more context to the foregoing, and illustrates some of the variety of systems in which the detailed technology can be employed:

New Age Librarian

James Taschek,

Sm@rt Partner

2/26/01 http://www.zdnet.com/products/stories/reviews/0,4161, 2689788,00.html

Your client's burgeoning digital assets are worthless, unless they can be retrieved and put to use. Retrieving them requires a solid process to store, name and index those assets, much the same as finding a book at the neighborhood library requires a card catalog. While Dewey hasn't evolved into the digital age, digital asset management (DAM) has turned a new page for integrators.

Digital assets are any type of information that can be digitized: user manuals, logos, brochures, MP3 files, advertisements and video clips, for example. Those are assets in the truest sense: They cost money to produce and sometimes are sold for profit, yet they often must be recreated because they're misplaced or were created in a format that cannot be repurposed.

That's where DAM comes into play. DAM is the secure management, storage, retrieval and distribution of digital assets. Or, as one vendor says, DAM aims to deliver "the right file in the right format to the right place at the right time."

DAM saves clients money by instituting a process where content can easily be found in relation to other assets-an image associated with a brochure, for example, or all video clips on airline disasters in the last two years. It also opens up new revenue opportunities for your clients by allowing content to be repurposed repeatedly for multiple distribution channels. As Pete Fernandez of e-business integrator Concero says, "The Holy Grail is to create once and publish everywhere." A DAM solution is a key part of that quest.

One DAM vendor says that there are two types of clients that need a DAM solution: The first is one where content is their product, such as a newspaper, advertising agency or movie studio: the second is everyone else. Even if that is an exaggeration, the point is clear: All companies have digital assets, and tracking those assets can save time and money. But DAM is a relatively new market, with little in the way of standards or competition. Nobody offers a complete solution. It's a market rife with integration opportunities.

How big's the potential payoff? DAM-related software spending will top $2 billion by 2003, up from $800 million today, predicts Rob Perry of The Yankee Group. Integrators are expected to reap $1 of services for every dollar spent on DAM software. Artesia president and COO Scott Bowen paints a rosier picture. He maintains that integrators can expect $2 to $8 of value-added service for every dollar spent on Artesia's Teams 4.1 software license.

Also, CAP Ventures Inc. senior consultant Leonor Ciarlone says, B2B collaboration has opened up, especially with channel partners. With DAM, third parties can get access to content quickly easily and securely. But integrators are expected to make access a reality.

Just One Chapter Digital asset management is only a small part of a giant workflow process that moves digital assets from production to distribution on various devices such as a Web browser, a WAP-enabled phone, a printed brochure or a DVD.

There are various analogies to how a DAM solution works, but the concept of a library seems to fit the best. A library stores paper-based books, magazines and newspapers, and electronic media such as microfiche, CDs and tapes. A DAM solution stores digital versions of images, music, video and text. And just as a library has a card catalogue that can be searched and in some cases even retrieve materials, so does a DAM solution with the digital assets. Some DAM solutions even take it one step further and convert assets from one format to another—prepping the information for multiple distribution channels.

Because a DAM solution is like a library, it must have a database—or somewhere to store the assets themselves and information about the assets, known as metadata. Many of the products mentioned here run on Oracle8i, although IBM's solution also runs on DB2, and Informix spin-off Ascential runs on an Informix database.

While those solution frameworks are tightly knit with their resident databases, they can tie into legacy databases via XML and ODBC connections—very important, considering that's probably where most companies are storing their assets and associated metadata.

What's in the Stacks? In summary, a DAM solution takes existing content, assigns metadata, converts it or stores it in a format that can be repurposed for distribution to multiple channels, and assigns rights and permissions to control who gains access to that content.

You can envision DAM as one part in the assembly line of a content factory (see chart at right).

The creators of content, such as a graphic designer, a technical writer or a videographer, design digital content or convert it from another source, such as video. Once the assets have been created, the creators will enter descriptive information about the content into the DAM solution. This metadata is similar to the metatags on a Web page.

Part of that metadata describes rights and permissions of the asset. The DAM solution will control who has what type of access to the content—that is especially important in B2B scenarios so third parties can have access to specific content without jeopardizing the entire database.

Check the Bibliography Entering the content into the DAM solution can be done either manually or automatically. Many of the solutions tie into video-logging programs such as Virage, so that video can be parsed and the placeholders can be indexed. The resulting metadata is entered into the DAM interface via XML, as well as manually. DAM solutions can handle most any type of rich media content. Storage-intensive files, such as video, generally are stored in an external database or a videotape library with an XML interface to the solution, which represents another integration opportunity. Other, smaller-sized files are stored directly within the DAM database.

But DAM solutions also work well with more conventional types of media integrating with workflow management products such as Documentum and FileNet. Text documents and rich media can be referenced from a common interface, which is the DAM solution.

The next step in the assembly line is an optional one—assigning (and enforcing) digital rights management (DRM) with products from InterTrust and Digimarc. DRM handles the rights and permissions to the content after it has been transferred from the DAM repository, but the access control defined in the DAM component governs the DRM system. Not all content has to have DRM, but it's important to protect copyrights for material that is for sale or has a high value—a brochure for a car probably wouldn't need DRM and, in fact, the company would want it to be distributed as far and wide as possible.

Also, as an alternative to DRM, Alchemedia's Clever Content platform is a digital image to which a variety of attributes have been attached and related to the content—a high-resolution image, for example—and then the content owner can track the image to minimize pirating.

Once the asset has been created, and metadata has been assigned and converted to the proper format, it is ready for integration with almost any application that can distribute it to another entity. The asset can be distributed in the form of broadcast or cable television videotape, radio, PDAs, Web browsers or print.

It's now distribution time, and this is where the opportunities are for you, your client and the recipient of the digital assets are endless. A primary feature of DAM solutions is interfacing with content-management tools such as Interwoven, Openpages and Vignette. Such interfacing allows one to easily assemble assets into a finished product for distribution.

Acquiring Your Library Card We'll warn you, however, entry into the digital asset management market is not easy for integrators. There's a big learning curve, and the practice requires the command of a wide range of skill sets.

The primary requirement for success, and this may sound like a given, is experience managing digital content. DAM products only automate the tasks of managing the content: it's the integrator/project leader who will play a key role in deciding the standards, the nomenclature, and the process to get creators and consumers of content to talk to each other. Just as with the proverbial library card catalog, the metadata that describes the digital assets has to mean the same thing to the creator of the content as to the distributor. Having someone on staff with a decree in library science would be a good idea.

While many of the DAM solutions require different skills, having a staff with expertise in databases, Java and XML will go a long way, as will knowledge of Solaris, AIX and Windows NT/2000, depending on the application.

The best client will be any company that has many types of digital assets, or analog assets that can be digitized. The real value-add for a DAM solution is the management of nontext, or rich, media. While these solutions can manage text and documents, there are other products (such as Documentum) that are better suited for that task.

You must know the culture of the client's organization intimately to pull off a successful DAM integration, as well as the business case for justifying the integration.

Don't Get Fined A subtle but important issue is the task of converting all of a client's existing analog assets to digital format. Don't kid yourself; it can be a monumental undertaking, but once it's done, the maintenance of the digital content will fall into place, provided the process for creating, naming and indexing the assets from this point forward is a good one. Half of the effort is in laying the groundwork.

While doing the conversion and planning the standards, it's important to pick the right file formats. One large media corporation executive with whom we spoke says it's better to pick a format that will last, rather than the most efficient one. As an example, just look at what happened to Sony's Betamax videotape and media. Beta tapes are still around, but do you know where a machine can be found to play a Beta tape? A file that can be read 20 years into the future sure beats one that can't be read at all.

The client's network needs to be able to handle a digital asset management solution. Going all digital requires a significant bandwidth increase, especially when transferring video files. Anticipate the same opportunity for storage capacity.

At the Checkout Desk The success in integrating DAM with other parts of the digital-content infrastructure will make or break the entire contract.

As long as you have competent XML and Java programmers and database experts, the mechanics of the integration should go reasonably well. What's key, though, is knowing what type of content should integrate with what type of technology, and that all depends on the needs of your customer.

To integrate DAM, your staff must have adequate training. Artesia even requires that its resellers go through its training program to learn both its API and how to deploy a DAM solution. And, to be sure, all of these solutions require integration.

It may be difficult to convince your client of the need for a digital asset management solution; however, more and more content is being created digitally every day. Getting a leg up now will put you at the front desk with the right book, while everyone else is still searching through the stacks.

Watermarked Puzzles

Jigsaw puzzles offer a great variety of applications for digital watermark technology. To name but a few:

A puzzle can have a watermark that is readable only when the puzzle is completely assembled properly. When the completed watermark is sensed by a webcam or the like, and relayed to Grand Central, the user's accomplishment can be acknowledged with a variety of "rewards" (e.g., a congratulatory message, a prize, etc.). The rewards can be served by the remote server and delivered to the user's computer. Or the remote server can trigger a reward that is locally stored on the user's machine. Instead of rewards, other actions can be triggered, such as linking to different URLs.

In a variant of the foregoing, the puzzle may be designed so it can be assembled in several different ways (e.g., many of the pieces have identical shapes, so can be substituted for like-shaped pieces). By assembling the puzzles in different ways, different watermark patterns are formed, and different prizes can be triggered. Or only selected ways of assembling the puzzle may trigger a prize.

The puzzle can form part of a game, including an on-line game or a multi-player game. Advancing through the game to more advanced levels may require demonstrating increased proficiency in assembling the puzzle. The game may pose tests or challenges that require correct assembly of the puzzle to meet.

The puzzle may or may not be printed with conventional puzzle artwork/graphics. In the latter case, all pieces may have a generally uniform printing pattern (e.g., a high-strength watermark pattern).

Puzzles other than jigsaw puzzles can use watermark technology as well.

Trade Shows and Wireless Data Broadcasting

Trade show booths have historically distributed printed product information. With the advent of wireless PDAs, new techniques of distributing product information become feasible.

One is to transmit image, audio, or video objects (e.g., files) to passers-by. Such content can be digitally watermarked with an ID that allows it to link through a remote database (e.g., Grand Central). When a visitor receives such an object, it can later be viewed on the PDA (or on another computer to which it is transferred. If the visitor wants to receive more information, a user interface can be actuated to effect a link to an on-line resource, such as a web page. One user interface is right-clicking on the object, and selecting from a displayed menu an option that links (e.g., through Grand Central) based on the watermark information encoded in the object. A great variety of other user interface paradigms can likewise be used.

Similar arrangements can be effected using technologies other than watermarks. For example, an object identifier can be stored in a file header, or otherwise associated with the object, and forwarded to a Grand Central-like remote server to initiate a link to an on-line resource. Or a literal URL can be conveyed with the object—in a header, by a watermark, or otherwise.

Thermochromic Inks

There is a class of inks whose characteristics vary with temperature. Most commonly, it is the color of such inks that varies with temperature.

Watermarks can be printed with thermochromic inks. When sensed by a color web cam, or other image sensor device, the color of the ink can be used to trigger an appropriate response (or to trigger no response at all).

Consider an ink that looks blue at 50 degrees Fahrenheit, and red at 80 degrees. Image data gathered by a color image sensor can segregate the different color channels (e.g., red/green/blue) and analyze each for a watermark. If a watermark is found in the red channel, a first response can be triggered (e.g., through Grand Central). If a watermark is found in the blue channel, a second—different—response can be triggered.

In the case just given, the watermark payload is constant (the ink pattern carries a single payload)—the difference arises by the color channel in which the watermark is sensed. This information would be relayed to Grand Central (e.g., as context information) with the payload so that different responses can be triggered in the two different cases.

In this case, as in others, the watermark-triggered action need not involve a remote server such as Grand Central. Instead, the local watermark decoder can trigger different actions locally.

As noted, only a single action may be involved, and it may be triggered only when the watermarked object is imaged at or near a predefined temperature. For example, product packaging may be watermarked with such ink as part of an anti-counterfeiting program. A suspect product may be scanned for a watermark at room temperature, and again after refrigerating to 50 degrees. Only if the watermark is sensed at the lower temperature (in the blue channel) and not at room temperature, does the package pass this test.

UV/IR Inks

In application 60/257,822, filed Dec. 21, 2000, the use of UV and IR inks in watermarking was discussed. Other disclosure on this topic is included in application Ser. No. 09/562,516.

It should be noted that such techniques are particularly well suited in deterring counterfeiting, e.g., product packaging, value documents, etc. Such markings are difficult to identify and reproduce. Handheld scanning devices can include UV or IR illumination sources, and read a watermark on a scanned object.

In preliminary studies, green, yellow, and red fluorescing UV inks seem to perform better than blue fluorescing UV ink.

Three types of IR inks are particularly contemplated for such applications:

IR Fluorescing Ink: Produces an invisible printed image that vibrantly fluoresces red when illuminated in short wave UV black light and a much less weaker red in long wave UV black light.

IR Dual Fluorescent Ink: Produces an invisible printed image that fluoresces in one color when illuminated with long wave UV black light and in an entirely different color when illuminated with short wave UV black light.

IR Invisible Readable Ink: Produces a generally invisible printed image that is identified in a very specific band of infrared spectral range.

The UV or IR inking can be applied by adding one additional plate to a printing run. (An additional color separation may be required in some print applications.)

Printing on a uniform background generally gives better reading reliability results than printing on a picture-printed background, with lighter uniform backgrounds seeming to perform better than darker backgrounds.

Banknote Security with Proteins and Biological Materials

One options for a banknote security feature involves placing proteins on the banknote which are then detected by a scanning device. In one embodiment, a banknote printer or issuer would pick an area of the note and place a few proteins or other biological identifiers within or on top of the substrate. The proteins would be very difficult if not impossible to reproduce unless a counterfeiter had the correct "encoding" device. These proteins could fit within a sub-micron space on the note or be spread all over the surface, like a digital watermark. The proteins may be, e.g., less than a thousandth of a micron in size, and may fluoresce (monochromatically, or with different colors) when subject to certain irradiation.

A scanning device would detect the existence of the proteins—if the proper proteins are detected then the note is legitimate. The scanning device could use any number of methods to find detection. The proteins could fluoresce or the proteins could have some other unique code or pattern that the scanner identifies. The device could be a visual cue or the protein could fluoresce a certain way only under certain lighting and temperature conditions such as infrared lighting. Using other identifier methods the protein identifier could be unique to the print run or denomination, and there could be unique identifiers to the actual individual note.

The proteins could be placed on a "tab" that is then placed on the note, similar to how holograms are bonded, or alternatively the protein delivery system could place the proteins directly on the substrate. The proteins have to survive many stresses of light, bacteria, fingers, washing etc.

The same techniques can naturally be used on value documents other than banknotes (e.g., passports, financial instruments, etc).

Watermarks in Electronically Displayed Data

As noted in application 60/257,822, a watermarked image can be presented on the LCD display of a wristwatch or the like, and captured by a webcam for various purposes.

It should be noted that the display can present alphanumeric text, which can then be decoded from the webcam image using known optical character recognition (OCR) techniques. Linking and other operations based on this information can then be undertaken, as described in the cited and '422 applications.

Rotating URLs for Security

Imagine a company or organization wants to have a site accessible through Digimarc MediaBridge (via the Grand Central server), but wants some level of security for the site. That is, they don't want links to the site emailed around, they don't want search engines indexing the site, etc. For example, Integraf may send out a brochure with "exclusive secure" access to a Integraf 2001 exhibitors web site. The site has some long obscure URL such as trytotypeinthislonnngobscureurlwithoutmakingamistake01112344567 with a 'dot com' suffix. The brochure, of course, is watermarked with an ID that links to the site (through Grand Central). Now imagine that the URL actually changes periodically. Grand Central knows of the change so that the brochure continues to serve its function, but saved links, forwarded links and search engine indexes become rapidly obsolete. The security of the site is controlled by the life of a URL. It could be varied from one second to one week depending on how sensitive the owning organization is. To the holder of the brochure (or other access document), the change is transparent, since the GrandCentral database changes the destination URL in synchrony with its movement by the organization.

A generalization of all of this is that each and every object can have its own, generally inaccessible, rich source of attached information and inherent interactivity. This could be an entire platform all to itself.

More on Watermarks and Handheld Detectors for Detection of Counterfeits

This process assumes that a product package is watermarked, or that a product has a watermarked hang tag. A handheld detector, such as a PDA with image capture (PalmPilot-like), would capture an image of the package/tag. Then:

The image would be examined for the presence of a watermark and would indicate on the device the presence or absence of the watermark. Or The image would be transmitted via a wireless link to a central site where the presence or absence of a watermark would be determined and an appropriate response returned to the handheld for display. Or If the transmission of the image to the central site was unsuccessful, either because of a response time constraint or the lack of available transmission medium, the detection would be performed locally as in the first situation.

Watermarks and Collectibles

Watermarks find various applications in connection with collectibles, action figures, and the like. Some of these are detailed in copending application Ser. No. 09/630,243 (now U.S. Pat. No. 6,735,324) (particularly focusing on baseball cards).

Action figures have expanded beyond G. I. Joes, and now include a range encompassing:

KISS action toys
X-Files
Army of Darkness
Janice Joplin
Edward Scissorhands
Doug and Bob MacKenzie
Spawn Many collectors buy two of an item—one to play with and one to keep shrink wrapped. Watermarks can be applied to the toy itself (e.g., the toy base) or to the packaging. The functionality served by the watermark can include confirming authenticity, linking to associated internet sites, serialization, etc.

Take, as an example, the Sanrio family of character branded merchandise available, such as Hello Kitty (see the Sanrio web site with the dot-corn extension). By watermarking products to permit Digimarc MediaBridge brand linking by customers, the brand manager can obtain real-time information about market acceptance of each different product, including which products are the most popular, the correlation between an ad campaign and sales of a product, etc.

(Previously, the brand manager needed to wait for such information to filter back up the retail supply channel, preventing real-time response strategies.) The purchasers, in turn, could be provided with opportunities to win prizes, participate in games, learn information, register for club benefits, etc., by linking from the products. The linking and interactivity provided by such watermark functionality may contribute to the cachet of some such products.

Watermarks and Cookbooks/How-To Books

Books, magazines, and other publications can be watermarked to permit users to link to on-line communities (e.g., discussion groups or forums) of other purchasers of the same items. The publication can be marked in its entirety, or just a cover, or just an internal section, etc. Different sections can have different marks and link to different on-line communities.

Thus, a home improvement book about building decks can permit a purchaser to link-to/correspond-with other individuals engaged in the same undertaking (and possibly link to the book's authors). The on-line community can be further tailored by the user's geographic location (which can be indicated to the remote server computer, e.g., by transmitting the user's zip code together with watermark information). Regional chat about the book or its subject can thus be facilitated (e.g., a reader in rainy Oregon may post a message asking others in the area about waterproofing treatments that have been used with success in their shared climate).

sure is the sum of the squares of the values in the sequence. The second measure is the square of the sum of the values in the sequence.

5. These two measures can be combined in various fashions to yield a final metric, or can be used individually in assessing watermark decay.

Watermarking Descriptors

The header of a file, such as the header of a file storing compressed video, e.g., in MPEG format, can include data conveying information about the form of watermark used in the file contents. The information can be literally expressed in the header, or information in the header can serve as a link to a remote data repository at which information about the file watermark is stored.

One approach is to employ XML tags in the header (MPEG-7 uses XML), e.g.:

<Watermarking Type>

<Watermarking Message>

A dictionary would desirably be established for each term. For example, <Watermarking Type> could include Digimarc Image version 1, Digimarc Image v2, Digimarc Video v1, Digimarc Video v2, Digimarc Audio v1, Digimarc Audio v2, Philips Video v1, Philips Video v2, etc. (including every existing watermarking company). And <Watermarking Message> could represent the watermark payload in a known format. For example, application message type 4 detailed in application 60/256,628, e.g.:

| Message Type | # of info Bits | A/V | CMC Bits | Content-Owner WM Version | Content-Owner ID | Content-Owner Object ID | Distributor WM Version | Distributor ID | Distributor Object ID | Misc Info |
|---|---|---|---|---|---|---|---|---|---|---|
| 16 bits | 16 bits | 1 bit | 31 bits | 8 bits | 96 bits | 96 bits | 8 bits | 96 bits | 96 bits | 96 bits |

Cookbooks are also well suited to such techniques—providing forums linking cooks with like-minded interests (e.g., purchasers of a tofu cookbook living along the Gulf coast). Again, different chapters can link to different communities.

The same approach of defining an on-line community of owners of a given publication can be extended beyond publications to any item (e.g., collectors of G. I. Joes <linking from product or packaging>, Ford Explorers <linking from watermarked key>, etc.).

Soft Bit Errors and Fragile Watermarking

Fragile watermarks are known, e.g., in pending application Ser. No. 09/433,104 (now, U.S. Pat. No. 6,636,615).

Content (e.g., audio or imagery) can be marked with a watermark, and decay of the watermark through compression and other processing can be used to determine the quality of the content. For example, the number of bit errors in the payload (including CRC and false positive bits) could determine the quality.

One procedure for measuring such decay is as follows:
1. Use the payload read from the watermark to re-create the original embedded bit sequence (including redundant bits) used for the watermark.
2. Convert the original bit sequence so that a zero is represented by −1 and a one is represented by 1.
3. Multiply (element-wise) the soft-valued bit sequence used to decode the watermark by the sequence of step 3.
4. Create two measures of watermark strength from the sequence resulting in the previous step. The first mea- These descriptors are beneficial since there may be many watermarks embedded in the content and it can take too long for the end-user while the system decodes all of the potential watermarks. A benefit of the header descriptors is that they increase the computational efficiency of reading watermarks since the watermarks only need to be read once, and then can be added to the MPEG-7 description (if using both descriptors). At least, the types of watermarks will be known and all watermarks don't need to be searched if the watermark message descriptor is not added for security reasons, although protected by MPEG-7 IPMP. If the meta data information contained in the header is suspect, then the information can be retrieved from the watermarked content itself. Likewise, if the meta data information in the header becomes lost, it can be regenerated from data conveyed by the content itself.

(Redundant representation of information in both the header and a content watermark was more generally disclosed in a series of patents filed by the present assigned in May, 1995, including U.S. Pat. Nos. 5,748,763, 5,850,481, 5,748, 783, and 5,636,292.)

Theatre Tickets, etc.

Movie and other event tickets may be purchased on-line from various sources. In this implementation, however, the ticket purchaser prints the purchased tickets on her home computer system (and printer). The printed tickets include embedded watermark data. (A ticket image, having a unique identifier or purchase code embedded therein, could be transferred to the user's computer for printing. Alternatively, the online movie ticket retailer transmits a payload or an authentication code to the user's computer. A plug-in is launched, which incorporates the payload information when creating and printing the tickets.).

At the movie theater, the ticket purchaser presents the watermarked ticket to a decoder. The decoder verifies authentic tickets by opening a gate or enabling a visual confirmation, e.g., a green light. The movie theater decoder can download a list of authentic payloads or identifiers prior to each showing, or may query an online database to verify each ticket. (Fragile watermarks are alternatively embedded in the printed ticket to help avoid counterfeiting.)

In still other arrangements, the user may have a talisman, such as a driver's license or key fob, that has a watermark embedded therein. When purchasing a ticket, the user may present the talisman to a camera or other detection device associated with their computer system. The camera reads the watermark, and relays it to the ticket vendor to associate that watermark payload with a virtual ticket. When the user arrives at the theatre, they can present the same talisman for sensing. The theatre's computer decodes the watermark, checks the payload against a list of authorized entrants, and permits entry if the user is found to be authorized.

Credit at a concession stand (or coupons for such) can be obtained by techniques like those above.

Every movie theater (and sporting arena, music concert venue, etc.) should be so enabled.

Collaborative Work Environments, etc.

Various systems permit several people to collaborate online on a single project (e.g., a document) from remote locations using shared tools. One is the 'sharethis' website with the extension .com. Watermarking can be employed advantageously in such arrangements.

Watermarking is usually the last step in a content-creation process, to ensure that the watermark is not accidentally destroyed. Thus, if content in a collaborative work system is not being modified but only shared, it could be watermarked and tracked through the system, including additional edge checks that users have the correct usage rights. Prior Digimarc applications have discussed usage scenarios like this with respect to digital asset management, content tracking for broadcasters, and Napster file sharing applications.

A different circumstance arises, however, if the collaborative work system is used to create or modify content.

In such a system, a watermark embedding function, such as a Postscript command with ID and robustness fields (parameters), could be specified during the creation process by the content creators, and the watermark could be actually embedded during rendering. For example, when designing Digimarc MediaBridge enabled packaging, the graphic designer and content owner could define the watermarking ID and robustness since they work closely during this stage. Then, the watermark ID is embedded whenever viewed on the computer screen, or, more importantly, proofed and printed at the RIP. Since the embedding process can be modified at the RIP, the color guru that controls the RIP can make sure the watermark is robust but invisible and the watermark can be embedded dependent upon the type of printer.

This example demonstrates several advantages. Some advantages relate to the fact that the watermark definition and embedding are separate. The content creator (such as graphic designer) can work with the content owner to define the watermark, while the watermark is rendered by the rendering expert, such as the color guru at the RIP or audio mastering engineer. In addition, the embedding engine knows the rendering device and can adjust the watermark for its characteristics. Other advantages include that the watermark can be embedded into structured content, such as vector graphics, MIDI and animation.

Extending the watermarking function concept to shared work spaces, the watermark can be added whenever the content is rendered by any client. The ID (payload), which can link to the internal representation of the content in the shared environment and/or the content owner, can be sent with the content, and the rendering client embeds the ID. The rendering client could embed its user's ID in addition to the content ID or instead of the content ID. As such, any rendering of the content is traceable.

This watermarking function may not explicitly be passed to the client for embedding, but implicitly known by the client.

For example, while the content owner is demonstrating a song-in-progress to critics, the content and rendering client IDs are embedded such that every rendition is traceable. Thus, if a critic uses their sound card or connected recorder to capture the song and the song shows up elsewhere, such as on Napster, the song can be traced to the client that rendered the content as well as back to the content owner for legitimate purchase—even though the song may have been changed after the demo.

Another important capability enabled by such approaches is variable data encoding. Variable data refers to systems, like serialization systems, in which several copies of a content item are being produced, and each is to have a unique (or customized) watermark ID. Often, this ID is not assigned until the moment the item is finally rendered (e.g., an object printed, or a CD pressed or played).

In summary, the above systems, in general, show that there are circumstances where the embedding should be moved to the edge of the network. Along similar lines, there have been other Digimarc patent filings about moving detection out to the edges of a network, such as on a set top box. Such approaches can also be employed in conjunction, e.g., with DVD, CD, and other media recording devices that embed identification information as content is being stored.

(An application related to the foregoing is 09/810,000, now U.S. Pat. No. 7,142,691.)

Promotional Content Distribution

Application Ser. No. 09/476,686 discloses a device that listens to ambient sound, and decodes a watermark from it (the device may be a cell phone, or a dedicated unit). The watermark can be used for various purposes, e.g., to identify a song. This technology, and such devices, are referred to by the name BirdDawg.

BirdDawg arrangements can be employed to offer promotional music. A example usage model is that after the user clicks on a "song info" button on the device, the central database returns to the cell phone the artist, song and album information as well as whether there is promotional music, concert information and purchases available. If the user selects the promotional music element (possibly one menu down under a "more info" menu), dependent upon the user's preferences, a link to the song can be emailed to the user or the user could have an audio locker to which the song becomes available, potentially the audio locker could be a central system or a local system. If the music is downloaded, it could be tracked via various one-to-one promotional systems.

One promotional system provides content (e.g., music) in a format that allows a first portion (e.g., 30 seconds) to be played freely. After 30 seconds, the user is invited to download software that may permit the full content to be played without interruption. The downloaded software includes digital rights management technology, permitting the content owner to specify conditions or limitations for use. The content may be watermarked. An operating system-level watermark detector can look for the watermark and interrupt the playing after 30 seconds unless over-ridden by instructions from the downloaded software. (Ergo, if the dowwnloaded software is not present, playback stops.) Thus, the birddawg device triggers delivery of a promotional excerpt of the music, which the recipient can render fully functional by downloading (if not already downloaded) certain ancillary software.

A BirdDawg device can be coupled to a car's navigation system. When a user purchases concert tickets through operation of the BirdDawg functionality, the system could offer directions to the concert. These directions could be saved in memory or as a bookmark so they can be used if the concert is not at the current time of the ticket purchase (which is likely).

Maps and Geo-Watermarking

Background (This subject matter is related to that disclosed in pending application Ser. No. 09/800,093 (now U.S. Pat. No. 7,061, 510) and Ser. No. 09/833,013, filed Apr. 10, 2001.

Digital watermarking has long been presented as a potential central element in digital asset management, particularly when those "assets" are photographs (implicitly including "digital images"). Copyright labeling, active copyright communication, marketing links, etc. and so forth, have all been well explored.

Within the universe of subject matter for photography is what is broadly referred to as remote sensing. Let us imagine that this includes all types of photography which somehow images the Earth's surface or its landscape. Add to this class all photography which somehow has an innate connection to a location on the Earth, and let us call this georeferenced photography for lack of an imagination. In the final analysis, virtually all photographs one way or another have innate geographic properties, if one stretches the definition far enough (even purely synthetic images are created by an author existing "somewhere"). But this is an academic extreme. What's more relevant to this disclosure is that "most" photographs, including swept-scan satellite imagery and radar, also including vacation snaps at Niagara Falls, can be described as having innate, if not always explicit, geographic properties. "Time" should also be included in these properties. The march of technological progress is transitioning more and more photography from the "innate" category to the "explicit" category through the use of GPS technology and/or local wireless technologies.

This disclosure concentrates on how digital watermarking (and specifically, its database linking properties) and georeferenced photography might inter-relate. The goal is to explore how the core utility of the former can be used as a platform to simplify and transform the latter. New capabilities would hopefully emerge in the process and from the result.

Details

It is well known and well explored that virtually all naturally taken images can be referenced by a "6+1" dimensional vector relative to the Earth's coordinate system. The six initial elements, in one given scheme, include:

Latitude

Longitude

Height (as compared to a mean-sea level sphere with an arbitrary time origin)

Time

Cardinal Direction

Azimuth

The "extra" dimension is itself multi-dimensional in nature, representing "sensor geometry", where there are a variety of types, each requiring various rules on how it is defined and how it affects the previous six parameters. Critical as these particulars might be for many applications, they are secondary to this disclosure. Suffice it to say that a simple rectangular fan or pyramid centered on a camera's aperture is the most common form of sensor geometry and can be used as a stand-in for many others. But as one final academic point, however, the notion of the "sensor geometry" is simply vernacular for a coherent set of optical sampling functions corresponding to each pixel and/or microdensity region of a photograph.

Beginning with the now-mature area of remote sensing, but extending to all photography with an innate 6+1 dimensional geovector as described above, digital watermarking itself can be extended to embrace this fundamental set of information inherent in each and every photograph. As the "copyright" is fundamentally a part of each and every photograph, so too is the "geovector" (if we can call it that, including time) a fundamental part of every photograph, and digital watermarking can expressly contain this information. As with the large prior art of digital watermarking explains, this information can either be contained in the embedded watermark information itself, or contained in a database to which the watermark represents a pointer, or both. Furthermore, all of the comments and explanations of redundant header structures apply here as well; in other words, certain geovector information might be triply redundant: watermark payload, header, database.

Standardization efforts are currently underway which are extending the idea of the geovector well beyond the basic elements presented above. Indeed, the above description is pretentious in its brevity relative to these efforts. See for example various geospatial and GIS efforts; the digital earth, etc., all having simple coordinate systems at their core; see also the opengis web site with the extension .com]. All of these efforts lend themselves to digital watermarking payloads, classic header structures, and pointed-to elements in an associated database.

A natural question to ask at this point would be: why? Why do all this with watermarking, won't standardized header structures work just fine?

Indeed headers alone would work just fine, in the abstract. Imagining a world where all things are digital and all header files stay permanently attached to their associated image data, watermarks are unnecessary. But in today's world, it is precisely this abstract property of permanent attachment which the digital watermark provides. This is the brain-dead first reason for including digital watermarking in the puzzle.

There is another reason digital watermarks might be a pragmatic foundation for a massively georeferenced system of imagery. At the end of the day, this second reason may be much more powerful that the "permanent attachment" property. The digital watermarking of photography currently involves the simple step of identifying an image followed hard upon by the storing of that identification in some database or across some group of databases. In other words, de facto standardization of identifying individual imagery is already underway in the form of digital watermarking. All manner of digital images, photography, file formats, prints, and whatnot, are all being registered in a single coherent cross-referenceable database. These aspects of digital watermarking are well explored in the prior art. So why not exploit this trend while further adding the dimension of geovector information in the process. The result is a database or set of coordinated databases which represent a searchable database suitable for geographically based queries. Whereas many of such systems have been around for some time now using classic header structures with matching database fields, digital watermarking possibly presents a more fundamental foundation capable of synthesizing past, present, and future initiatives. Time will tell. There are quite legitimate "proprietary database" concerns buried in this notion, but in the final analysis, the only issue is ensuring a collision-free serial numbering system for identifying imagery, owners, and attributes, a task where digital watermarking is the de facto front runner with no runner's up in sight.

A third reason that digital watermarks should be considered in creating a georeferenced system of images touches upon basic common sense. A classic notion in most standardizations across all industries is the notion of the "stamp" or "seal" or similar concept of indicating that some object has successfully completed its appointed rounds of dotting i's and crossing t's. Call it branding, call it formality, call it a soft form of "authenticity"; the historical momentum behind such a concept is huge. In the case of ensuring that a given image is properly georeferenced by whatever standards are chosen, wouldn't it be nice if digitally watermarking that image as a kind of final step represents a formalized good housekeeping seal of approval. Various software and hardware taught to deal with such imagery can be programmed to routinely read these digital watermarks and display the appropriate brand logos, seals, certificates, or dancing regal elephants. Prior art digital watermarking disclosures explore the range of creative options (often targeting "branding" as a marketing concept) better than we can try here. In summary, digital watermarking can not only serve this common sense function, but the "seal" itself is a functional element of the standardization process, serving many functions including permanent attachment to the standardized and dynamic metadata.

A fourth reason that digital watermarks can be part of a georeferenced database system is also a practical one: Images by their very nature can be inter-processed, merged, split, cut up, etc. and so forth as described quite fully in the prior art. This tendency is especially applicable to various geo-referenced imagery applications where various data sets are merged and viewed as derivative images. Ask any database engineer or operator to manage the behind-the-scenes management of keeping track of the bits and pieces, and you'll quickly hear either a grown, or see a grin when they hand you the development budget for such a system. Digital watermarks, in many if not all such applications, can become a good way of coordinating and keeping track of highly diverse image components.

Encoded DNA

DNA may be tailored to convey digital information.

As is well understood, DNA is a polymer in the form of double-helix—a spiral comprising two long chains of monomer nucleotides wound about each other. The nucleotides each comprises a deoxyribose sugar molecule attached to a phosphate group and one of four nitrogenous bases: adenine, guanine, cytosine and thymine. The strands are linked to each other by hydrogen bonds between the bases, which uniquely pair: adenine with thymine; guanine with cytosine.

As presently understood, some of the DNA components are inactive. That is, they can be changed essentially without consequence. As such, they may be tailored in a manner to convey data.

In a simple application, an adenine-guanine (AG) pair may represent a digital "1", and a cytosine-thymine (C-T) pair may represent a digital "0." Inactive parts of an organism's DNA may thus be tailored so that these inactive components serve to convey digital data. This has numerous applications, including forensic tracking (e.g., uniquely marking different strains of anthrax).

Desirably, data encoded in DNA is encoded redundantly, so that corruption of some part of the structure does not cause data loss. The same data may be represented at several different locations in the DNA structure. Or, sometimes more desirably, error-correcting coding techniques, such as BCH ("trellis"), convolutional coding, and turbo codes, can be employed so that the correct data payload can be discerned notwithstanding sometimes severe corruption of the structure.

The data conveyed by DNA need not be a single digital string (e.g., representing a number), but may represent several different types of data, e.g., an index number, a creation date, a proprietor, etc. The index number can serve to identify a database record containing more information associated with that DNA. The data can also comprise executable software code or other instructions.

In addition to conveying data, the inactive components of the DNA can also serve as synchronization markers, e.g., indicating where encoded data starts or stops.

The data needn't solely be represented by the pattern of inactive components. In some arrangements, use can be made of the active components as well. For example, an inactive component in a range that also includes active components can change some statistic or attribute of the range (e.g., changing the number of A-G pairings to an even number may represent a "1;" changing the number to an odd number may represent a "0"). Different ranges of the DNA structure may convey different parts of the payload.

It will be recognized that DNA is susceptible to conveyance of information by forms of expression other than binary. In the example just given, base 4 representations may be used:

| Value | # of A-G Pairings | # of C-T Pairings |
|-------|-------------------|-------------------|
| 0 | Even | Even |
| 1 | Even | Odd |
| 2 | Odd | Even |
| 3 | Odd | Odd |

If A-T pairings are distinguished from T-A pairings (and C-T pairings distinguished from T-C pairings), then base-8 forms of expression may be used.

In other arrangements, the values of the payload encoded in the inactive components can be related to, or based on, the details of the active components. By such arrangement, the integrity of the auxiliary data can be checked to ensure that it corresponds in the expected manner with the active components.

Detection of such coding can be performed in various manners. One is by inspection techniques. Another is by gene sequencing techniques. Another is by de-linking the two nucleotides, and attempting to link them to different reference nucleotides—each expressing a different payload. Other decoding techniques may of course also be practiced.

By encoding a known pattern into the inactive components, it is possible to gain insight into the number of replications the DNA has undergone between encoding and decoding. The statistics by which errors are introduced through DNA replication can be empirically determined, or statistically estimated. If the original DNA structure is known, then examination of a later generation of that structure—and assessment of the number of errors introduced since encoding—can allow estimation of the number of generations-removed that the tested DNA is from the DNA originally encoded.

Recap

To review, according to one aspect, the invention is a method that includes: receiving data representing a content object; processing the content object; sending the processed content object to a remote computer; and further processing the content object on the remote computer, said further processing including decoding plural-bit data steganographically encoded therein.

In a variant of the foregoing, the method can include timestamping or encrypting the more compact representation of the content object sent to the remote computer.

Conclusion

To provide a comprehensive disclosure without unduly lengthening this specification, the patents and applications cited above are incorporated herein by references.

Having described and illustrated the subject technologies with reference to illustrative embodiments, it should be recognized that the invention is not so limited.

For example, while the detailed description focused on digital watermarks to convey auxiliary information with audio and video content, other techniques can be used as well (e.g., VBI, digital fingerprints, header meta data, etc.). Likewise, in embodiments relating to marking of physical objects, other machine-readable data representations can be employed (e.g., bar codes, glyphs, RF IDs, mag stripes, smart card technology, etc.).

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the above-detailed embodiments are exemplary only; the interchanging and substitution of these teachings with other teachings in this and the incorporated-by-reference patents/applications are also contemplated.

I claim:

1. A method comprising:
   capturing data representing steganographically encoded content using a first device, said first device comprising a cell phone;
   in said first device, processing the captured data representing the steganographically-encoded content a first time to yield processed content data;
   sending the processed content data to a second processing device at a second, remote location; and
   further processing the processed content data on the second processing device, said further processing including decoding plural-bit data steganographically encoded therein.

2. The method of claim 1, in which said content data comprises image data.

3. The method of claim 1 in which said content data comprises audio data.

4. The method of claim 1 in which said content data comprises video data.

* * * * *